July 9, 1968

J. F. ZIEVERS ET AL 3,391,789

WASTE TREATMENT APPARATUS

Filed June 11, 1965

Inventors.
James F. Zievers,
Clay W. Riley, &
Richard W. Crain.

By Fidler, Bradley & Patnaude
Attys.

United States Patent Office 3,391,789
Patented July 9, 1968

3,391,789
WASTE TREATMENT APPARATUS
James F. Zievers, La Grange, Clay W. Riley, Palos Heights, and Richard W. Crain, La Grange, Ill., assignors to Industrial Filter & Pump Mfg. Co., Cicero, Ill., a corporation of Illinois
Filed June 11, 1965, Ser. No. 463,230
13 Claims. (Cl. 210—95)

ABSTRACT OF THE DISCLOSURE

A system for treating waste rinses from metal finishing includes at least one motor driven impeller mounted in a vertical mixing chamber and a pump for continuously passing the waste liquid to be treated through the mixing chamber. The impeller recirculates a portion of the flowing fluid to form a vortex, and a treating chemical is introduced into the vortex via a feed conduit for mixing with the rinses to be treated.

---

The present invention relates to waste treatment systems and more particularly to a method and apparatus for the simple economic treatment of metal finishing wastes, such as cyanid bearing rinses and chrome bearing wastes.

In the prior art, conventional retention tanks were required for waste chemical treatment. Such tanks were large, thus requiring a substantial amount of space. Furthermore, the prior art process was extremely time consuming. In contrast, with the simple treatment units of the present invention it is unnecessary to use the prior art retention tanks. The system of this invention also operates more quickly and requires substantially less space than the prior art systems.

The novel apparatus of the present invention may be mounted upon a skid substantially 4 ft. x 4 ft. and is relatively portable. This apparatus includes a storage tank for alkali, a primer tank, a sump pump, one or more motor driven mixing chambers which are utilized for first stage and second stage treatment of wastes, and a plurality of feed pumps. The feed pumps may be operatively mounted on the same portable skid along with the piping and the controls for operating the sump motors thereby forming a compact unit.

The system of this invention will treat waste rinses from metal finishing with a minimum of manual adjustment, although it is within the scope of the invention that the system may be automated to varying degrees for any particular waste with which this invention may be utilized.

The basic unit of the present invention is adaptable as a single stage treatment system for the reduction of highly toxic hexavalent chromium waste to the trivalent state or to the oxidation of cyanide to cyanate. The single stage unit preferably comprises a compact arrangement of a motor driven sump pump operatively connected to a primer tank. The sump pump discharges into a mixing chamber having two spaced impellers axially mounted on and driven by a single shaft. Inlets are provided adjacent each impeller for the treating chemicals. The waste to be treated enters near the bottom of the mixing chamber, passes upwardly through the chamber where it is treated by the treating chemicals and is discharged near the top. Two mixing chambers may be connected in series to provide a two-stage unit for the thorough elimination of cyanide waste products if the output from the single stage unit cannot be disposed of due to local restrictions.

The reduction of highly toxic hexavalent chromium to the trivalent state is effected with the single stage unit in the acid phase using sulphur dioxide as the reductant. Chrome bearing wastes should preferably be segregated from all others and sent to a central collection sump or sumps in order that it may be picked up by the single stage unit's primer strainer tank. Any concentrated dumps must be held and bled into the system over a reasonable period of time. The resulting effluent from the single stage unit of this invention may in most cases be sent to the sanitary or storm sewer with dilution by continuously flowing acid and alkali rinses. Some governmental regulatory agencies may require subsequent alkaline neutralization which is a simple pH increase from pH 3–4 to pH 5–9. In such event, Cr (OH)$_3$ precipitates and may have to be removed by filtration or other means.

In utilizing the single or two stage unit in a cyanide destruction system, oxidation is effected by the alkaline chlorination method on a continuous basis. The destruction of cyanide rinse waters may be either by partial oxidation to the cyanate state (acceptable in some areas depending upon the local governmental regulation) or complete destruction to carbonaceous and nitrogenus end products. Cyanide rinses should be segregated from all others and sent to a central collection sump or sumps in order that it may be picked up by the unit's primer strainer tank. Any concentrated dumps must be held and bled into a dilute system over a reasonable period of time. The treated effluent from either the single or two stage unit may flow directly into a sanitary or storm sewer without further treatment, however, filtration for removal of precipitated metal hydrates are required by some governmental regulatory agencies.

Therefore, an object of the present invention is to provide a new and improved single stage apparatus for the continuous reduction of metallic waste particularly highly toxic hexavalent chromium and cyanide rinse waters.

Another object of the invention is the single stage reduction of hexavalent to trivalent chromium on a continuus basis utilizing sulphur dioxide and sulphuric acid in a mixing chamber through which the contaminated chromium waste is passed.

Still another object of the invention is the oxidation of cyanide bearing rinses to the cyanate stage continuously utilizing chlorine and an alkaline solution simultaneously fed into a mixing chamber while the contaminated waste in the form of cyanide rinses is fed continuously through the mixing chamber.

Another object of the invention is the complete oxidation of cyanide bearing rinses to carbonaceous and nitrogenous end products by treating the contaminated waste in the form of cyanide bearing rinses by passing the contaminated waste through two mixing chambers in series and treating the contaminated waste as the contaminated waste passes through the first stage with chlorine and an alkaline solution and subsequently treating the pretreated contaminated waste in a second mixing chamber with chlorine and alkaline solution.

Still another object of the invention is to provide an improved single stage apparatus which may be used for either cyanide destruction or for chromium reduction including a motor actuated waste pump adapted to be connected to a reservoir of contaminated waste for discharging the contaminated waste through a motor operated mixing chamber adapted for connection to a source of chlorine and alkaline solution when the apparatus is used as a cyanide destruction system, and adapted for connection to a source of sulphur dioxide and sulphuric acid when the apparatus is used as a chrome reduction system.

Another object of the invention is to provide an improved two stage apparatus for use in a cyanide destruction system wherein the two stage apparatus preferably comprises a motor actuated sump pump adapted for connection to a cyanide rinse sump for pumping the cyanide rinse through two mixing chambers operatively connected in series and into which chlorine and alkaline solution are discharged as the cyanide rinse is passed therethrough for the destruction of cyanide after which the treated waste may be discharged.

A further object of the invention is to provide a new and improved method of reducion of highly toxic hexavalent chromium to the trivalent state on a continuous basis wherein the reduction is effected in the acid phase using sulphur dioxide as a reductant.

Another object of the invention is to provide a new and improved method of oxidation of cyanide bearing rinses to the cyanate stage continuously wherein the oxidation is effected by the alkaline chlorination of the cyanide bearing rinse.

A further object of the invention is the method of complete oxidation of cyanide bearing rinses to carbonaceous and nitrogenous end products.

The invention, both as to its organization and method of operation, together with further objects and advantages thereof, will best be understood by reference to the following detailed description taken in connection with the accompanying drawings, in which.

Referring now to the drawings and particularly to FIGURE 1 thru FIGURE 11, a preferred form of two stage apparatus for use in a cyanide waste treatment system will be particularly described. In this particular cyanide system 10, cyanide as high as 810 parts per million in a metallic plating solution having a pH between 7 and 10 can be readily destroyed.

Figures 1, 2, 3, 4, 6, 8:
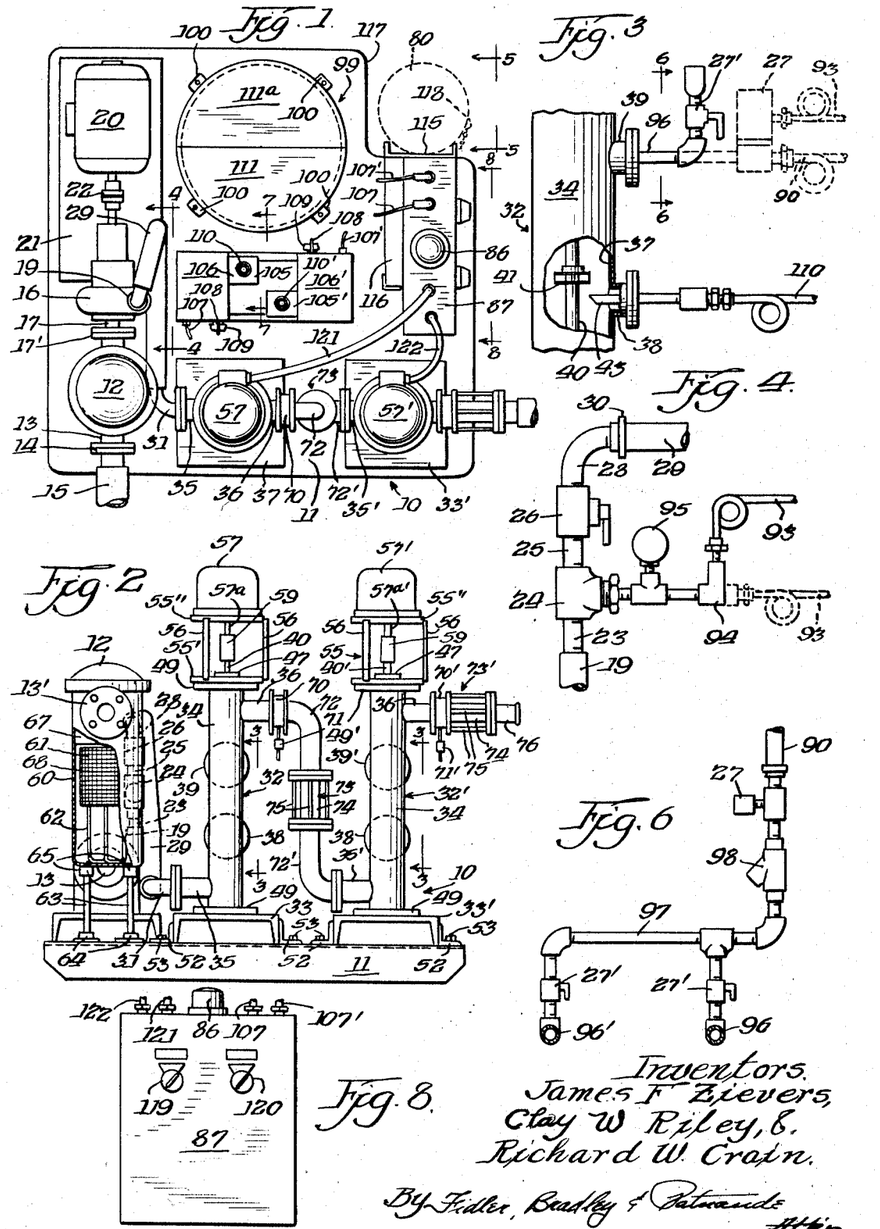
FIGURE 1 is a plan view of a two stage compact unit for the treatment of cyanide wastes in a cyanide destruction system.
FIGURE 2 is a view in vertical elevation of the two stage apparatus of FIGURE 1.
FIGURE 3 is a partial vertical view, in elevation, of a portion of the mixing chamber assembly illustrating an impeller thereof and the connection for the chemical feed pipe, taken along lines 3—3 of FIGURE 2, and looking in the direction of the arrows.
FIGURE 4 is a view in elevation taken along lines 4—4 of FIGURE 1 looking in the direction of the arrows illustrating the piping to the pump discharge connection and the plug for controlling the flow rate and providing back pressure to actuate the automatic valve on the chlorine feed.
FIGURE 6 is a vertical view in elevation taken along lines 6—6 of FIGURE 3, illustrating the chlorine connections to the mixing chambers of the two stage cyanide destruction system.
FIGURE 8 is a front view in elevation, taken along lines 8—8 of FIGURE 1, looking in the directions of the arrows of the front view of the control panel showing the alarm bell, the sump pump switch and the alarm bell switch.

A skid 11, referring to FIGURE 1 and FIGURE 2, has operatively mounted thereon a primer strainer tank assembly 12 which is connected by a flanged pipe connection 13 affixed to a flanged hose connection 14 which in turn may be connected to a suitable hose 15 leading to a waste sump (not shown). An all iron sump pump 16 has its inlet pipe flange 17 suitably affixed to the outlet pipe flange 17' of the primer strainer tank 12. The sump pump 16 is provided with a pump discharge connection 19 for connecting the sump pump to the cyanide waste destruction system.

The sump pump 16 is driven through an electric motor 20 mounted upon a base 21 in turn suitably affixed to the skid 11. A suitable coupling 22 operatively connects the motor shaft and pump shaft together. In the embodiment of FIGURE 1, the motor 20 is shown mounted on the base 21 though it is also within the scope of the invention that the sump pump 16 may also be mounted upon base 21 permitting the motor and pump to be replaced as a unit for inspection and repairs in case of a breakdown. In this embodiment, the motor 20 may be separately disconnected at the coupling from the pump, though if necessary for the purpose of inspection and repair, the pump 16 may be readily replaced by disconnecting the coupling 22 and the flanges 17 and 17'.

The electric motor 20 is preferably a totally enclosed motor for chemical operations and is rated at 3 horsepower at 3500 r.p.m. and may be connected to a 220/440 volt 3 phase 60 cycle A.C. source depending upon the source of power available.

Referring to FIGURE 1, FIGURE 2 and FIGURE 4, the waste liquid being treated is discharged through the pump discharge connection 19 which is suitably connected to a coupling 23, a T connection 24, a nipple 25 and a plug-cock 26. The plug-cock 26 controls the flow rate of the waste liquid and provides back pressure to actuate an automatic valve 27. In FIGURE 3 there is illustrated a modified control which is a manually actuated plug valve 27' in contract to the automatic valve discussed above. From the plug-cock 26, the waste liquid being treated is discharged through an elbow 28, FIGURE 4, which may be connected to a suitable chemical hose 29 formed of neoprene or like synthetic material which resists chemical solutions. The hose 29 may be connected directly to elbow 28 and clamped in place by a hose clamp 30. An alternate construction would be to use a short nipple, a regular L, another short nipple connecting the plug-cock 26 to the hoe 29. Other simple pipe connections would suggest themselves to those skilled in the art. The hose 29 is connected to a flanged L 31 and the plastic hose 29 is suitably affixed on the connection by a suitable clamp. Although hose clamps have not been particularly illustrated in order to reduce the details of the drawings, suitable hose clamps are preferably used to maintain leak-proof connections in view of the nature of the waste fluids being treated.

In the two stage apparatus for the cyanide destruction, two similar mixing chambers 32 and 32' are connected in tandem and suitably affixed and mounted upon their respective supporting bases 33 and 33' which in turn are affixed to the skid 11 so that the center-line of the mixing chambers is parallel to an edge of the skid and at right angles to the center line of the motor-pump and primer strainer tank, along the contiguous right angle edge of the skid.

Figures 5, 7, 9, 10:
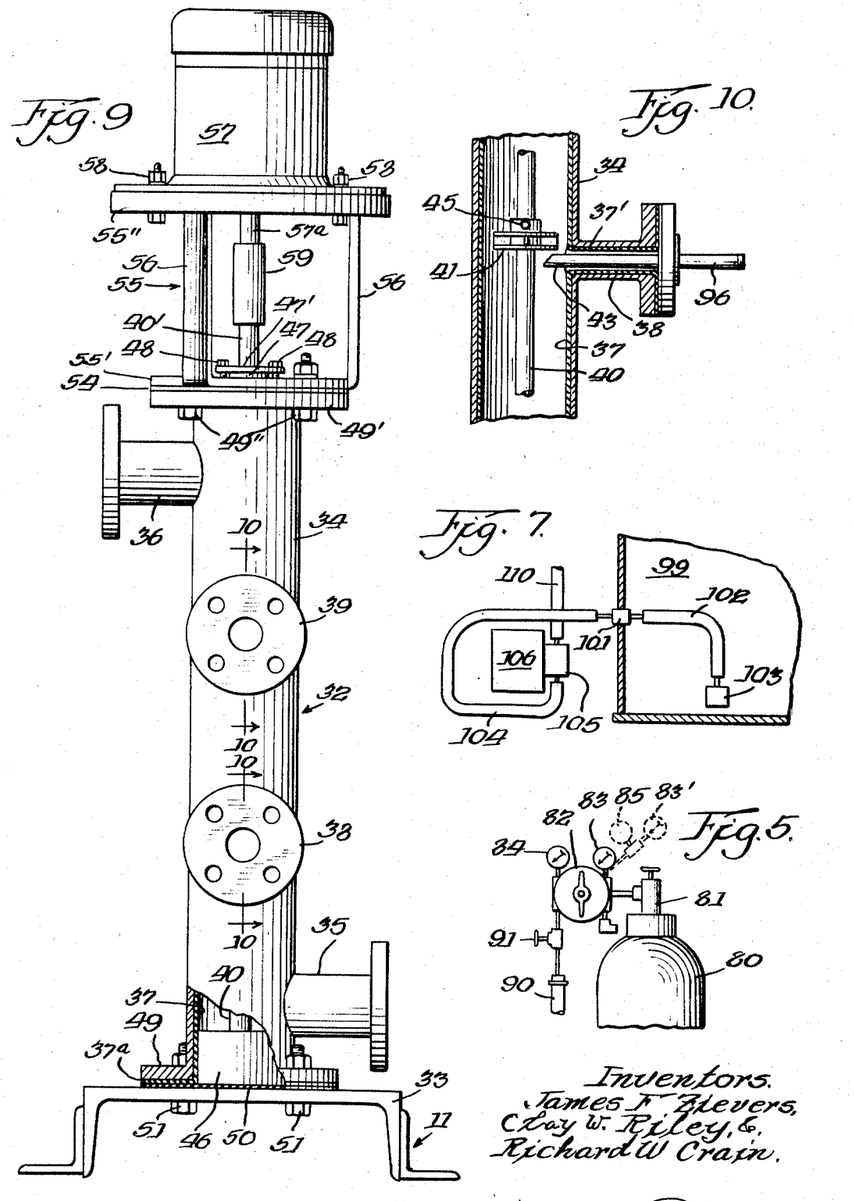
FIGURE 5 is a view taken along the lines 5—5 of FIGURE 1, looking in the directions of the arrows, illustrating the pressure regulating valve, gauges and low pressure alarm switch operatively connected to a gas cylinder which is used for chlorine or sulphur dioxide and the controls of the two stage system for cyanide destruction for adjusting the flow of chlorine gas to each stage.
FIGURE 7 is an elevational view, partly in section, taken along lines 7—7 of FIGURE 1 illustrating the connection of an alkali feed pump to the alkali storage tank.
FIGURE 9 is a vertical elevational view, partly in section, of the mixing chamber assembly including the motor drive therefore.
FIGURE 10 is a vertical sectional view, taken along lines 10—10 of FIGURE 9, looking in the directions of the arrows, illustrating one of the impellers and a chemical feed pipe for feeding a chemical into the vortex of the impeller adjacent thereto.

Since each of the mixing chambers 32 and 32' are identical, the construction of the single mixing chamber 32 will be described referring particularly to FIGURE 2, FIGURE 3, FIGURE 9 and FIGURE 10. Referring to FIGURE 2 and FIGURE 9, the mixing chamber 32 is reversed 180 degrees from its position as operatively mounted in the apparatus as illustrated in FIGURE 2. The mixing chamber assembly 32 preferably comprises a cylindrical chamber 34 to which are arc welded similarly formed lower flanged conduit 35 and upper flange conduit 36. The flanged conduits 35 and 36 are respectively positioned 180 degrees from each other. The fluid to be treated flows from the sump pump 16 through the flanged L 31 through the lower flanged conduit 35 into and upwardly through the cylindrical chamber 34 and after treatment is discharged outwardly through the upper flanged conduit 36. The interior of the chamber 34 is preferably lined with a neoprene lining 37. As illustrated in FIGURE 10, the lining 37 is extended as a conduit lining 37' through the vertically spaced and similarly formed flanged conduits 38 and 39 for the mounting of the respective chemical feed pipes to be described later in connection with the operation of the two stage cyanide destruction system of FIGURE 11 and the single stage cyanide destruction system and/or of a single stage chrome reduction system of FIGURE 12.

Referring to FIGURES 2, 3, 9 and 10, the mixing chamber assembly 32 operatively mounts an impeller 41 and 42. Each impeller as illustrated in FIGURE 3 and FIGURE 10 is of the turbine type and is slightly spaced above the opening of the respective conduits 38 and 39 into the mixing chamber so that the respective feed pipes 43 and 44 can feed the chemicals with which the waste solutions is treated directly into the vortex of the respective impellers. Each impeller 41 and 42 is affixed to the impeller shaft 40 by Allen set screws 45. If found desirable, the impellers 41 and 42 may be operatively mounted on a key way extending vertically within the range of adjustment of the impellers, the impellers being mounted by suitable keys and in turn affixed by set screws. It is preferred to use an enclosed impeller as illustrated in FIGURE 3 and FIGURE 10 though other forms of impellers may be used. In this embodiment, it is preferred to use an impeller having four flat vanes and the rate of pumping of the impellers is preferably greater than the flow of fluid to the mixing chamber.

The impeller shaft 40 is journaled at its lower end in a shaft guide 46, FIGURE 9, and at its upper end in a stuffing box 47. The stuffing box 47 may be of conventional construction using suitable packing and is held in position by cap screws 48 so that the packing gland 47' may be detachably affixed for inspection and repacking of the stuffing box assembly 47.

The mixing chamber assembly 32 is formed with a lower flange 49. Leakage of the fluid waste is prevented by the flanged end 37a of the neoprene lining 37 and a blind full faced gasket 50 the same diameter as the flange 49 and placed between flange 37a of the lining and the upper face of the supporting base or platform 33. The entire mixing chamber 32 is securely affixed to the platform 33 by suitable securing means 51 in the form of bolts and nuts.

As shown in FIGURE 2, each platform for the respective mixing chambers 32 and 32' is affixed to skid 11 by angle brackets 52 welded to the vertical edge of the channel shaped members forming the supporting bases 33 and 33' and in turn is affixed to the skids by suitable securing means 53.

The upper end of the cylindrical mixing chamber 34 is formed with an upper annular flange 49' similar to the bottom annular flange 49 to which is affixed a gasket 54. A motor mount 55 including the stuffing box assembly 47 is detachably mounted to the annular flange 49' by suitable cap screws 49". The motor mount and stuffing box together with the packing gland therefore and the gasket 54 effectively seal the upper end of the mixing chamber assembly so that the fluid waste being treated may not leak around the impeller shaft 40 at the upper end thereof or at the juncture of the flange 55' with the gasket 54 and the flange 49' of the mixing chamber 34.

The motor mounting 55 comprises the lower flange construction 55' and a similarly formed upper flange construction 55". The flanges 55' and 55" are vertically spaced apart by three vertical support members 56 which are welded to the flanges 55' and 55". The motor mount 55 has axed thereto an electric motor 57 which is preferably a ⅓ H.P. "C" flange motor rated at 1725 r.p.m. and using 220/440 volt-3 phase-60 cycle power. The flange of motor 57 is suitably affixed to the upper flange 55" of the motor mounting 55 by suitable securing means 58 such as cap screws and nuts. A ⅝" rigid shaft coupling 59 operatively secures the motor shaft 57a to the upper end 40' of the impeller shaft 40. The shaft coupling 59 is keyed to the motor shaft 57a and impeller shaft 40 with a square key $\frac{3}{16}$" x 1¼" long and suitably affixed together with socket set screws or Allen set screws (not shown). With this construction of the mixing chamber assembly, the motor 57 and motor mount 55 may be readily detached for inspection and repair from the impeller shaft 40 of the mixing chamber assembly 32. Likewise, the impeller shaft 40 and impellers 41 and 42 may be readily detached for inspection and repair from the mixing chamber assembly. Also, the relationship of the impellers 41 and 42 with respect to their respective treating chemical feed lines may be properly set, and normally, after setting, remains in the adjusted position until such time it is necessary to adjust the relative amount of the chemical being fed to their respective impellers for thoroughly mixing the treating chemicals with the waste fluids being treated.

Referring to FIG. 1 and FIG. 2, the primer strainer tank assembly 12 preferably comprises a steel tank 60, which is 8" in diameter by 20" in height, having operatively mounted therein a wire strainer basket 61 supported by a wire support frame 62. A flanged outlet pipe connection 13 is jointed to the bottom peripheral edge of the tank, the outlet conduit being welded in place. In order to support the primer tank assembly at its proper height with respect to the other parts of the apparatus of the waste treatment system, pipe nipples 63 are affixed to waste nuts or pipe floor flanges 64 which are affixed to the skid 11 and the upper end of the pipe nipples 63 are affixed to pipe couplings 65 welded to the bottom of the primer tank 60. At the upper end of the primer tank 60, the flange nilet pipe connection 13' is affixed by welding or the like to a hole formed at the upepr end of the tank. In the preferred arrangement of the primer tank assembly, the inlet and outlet conduits are arranged as described, however it is within the scope of the invention that other arrangements of conduits may be operatively connected to the primer tank assembly.

It is also within the scope of the invention to provide a rubber lining for the primer tank to overcome any corrosion of the metal of the primer tanks due to the waste fluid which is being treated. Such a rubber liner would preferably include liner portions for the conduit and also for the rim of the primer tank. The cover 12 is preferably secured in place by conventional eyebolt assemblies (not shown) wherein the eyebolt assemblies preferably five in number are equally spaced about the tank and the cover with the eye-bolts hinged to the tank to extend into a suitable slot for each of the eye-bolts. The cover 12 may then be clamped tightly to the tank with a gasket sealing the joint. When a lining is used in the primer tank, an O-ring spacer is usually placed slightly below the upper portion 67 of the strainer basket.

Referring to FIGURES 1, 7, 9, 10, and 11, the preferred piping arrangement for the two stage cyanide treatment apparatus will be described. The mixing chamber assemblies for the two stage system as well as a primer tank assembly, have been described. The flow of the waste fluid being treated has been described from a rinse sump, particularly a cyanide rinse sump for the two stage cyanide destruction system through the hose 15 into the primer tank assembly to the sump pump 16 and the hose 29 into the first mixing chamber assembly 32.

In starting the flow of cyanide rinse to be treated, the system may be primed through the primer tank with either a cyanide rinse or with water to fill the systems so that the pump will not suck in air but will start drawing fluid from the rinse sump. First stage mixing chamber 32 is connected to the second stage mixing chamber 32' by piping including the sampling coupling 70 in which is mounted a sampling cock 71. The sampling coupling 70 is suitably affixed to the flanged coupling 36 and the flanged angle L connection 72. A sight glass assembly 73 including a sight glass 74 and bolts 75 for suitably affixing the sight glass 74 between flanges of the sight glass assembly, is joined to flanged coupling 36. From the sight glass assembly 73, the fluid being treated goes through a right angle L connection 72' affixed to the lower flange connection 35' of the second stage mixing chamber 32'. It is to be understood that each of the flange couplings of the sampling coupling 70 the connection 72, 72' and the sight glass assembly 73 are suitably affixed together and also sealed properly using suitable securing means (not shown) in order that the drawings may be simplified.

The fluid after it has been treated in the second mixing chamber 32' is discharged through the upper flanged conduit 36' through the sampling coupling 70' to which a sampling cock 71' is operatively mounted for taking samples of the treated fluid for testing. The treated fluid is discharged through sight glass assembly 73' to a flanged hose connection 76. A suitable hose for the discharge of the final products from the cyanide destruction system may lead to a sump from which any of the gases evolved in the treatment may escape into the atmosphere and any resulting fluid may be discharged to a sewer or the like.

Figure 11:
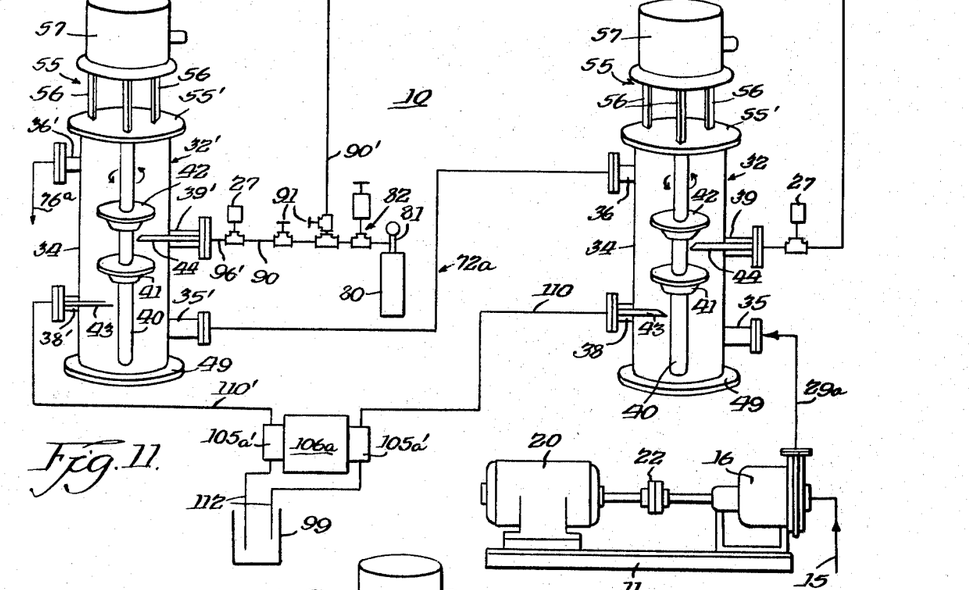
FIGURE 11 is a schematic diagram illustrating the mixing chambers, alkali pump, chlorine cylinder and waste pump and the flow of the contaminated waste to be treated in a two stage cyanide destruction system.

Referring to FIG. 11, the piping for chlorine gas to the two mixing chambers will be described. The chlorine gas used in this system is supplied from a commercial chlorine pressure cylinder 80. The chlorine cylinder 80, FIG. 5, includes a cylinder valve 81 which permits attachment of cylinder 80 to the chlorine pressure regulating valve 82 which regulates the pressure of the chlorine within the range of 150 lbs. maximum pressure, which is the nominal pressure of chlorine in the gas cylinder. The pressure regulating valve 82 has operatively mounted with respect thereto a cylinder pressure gauge 83 and a feed pressure gauge 84.

Referring to FIG. 5, the cylinder pressure gauge 83' may also be used with a pressure switch 85 which may be electrically connected to an alarm bell 86 FIGURE 1 and FIGURE 8 of a control panel 87 to signal the operator that the pressure within the chlorine cylinder has been lowered below its normal level and that the two stage cyanide destruction system must have the chlorine replenished. If the chlorine feed as illustrated in FIGURE 3, has an automatic valve 27 incorporated in the system, this automatic valve 27 stops the chlorine feed when motor driven sump pump 16 is turned off.

Figure 12:
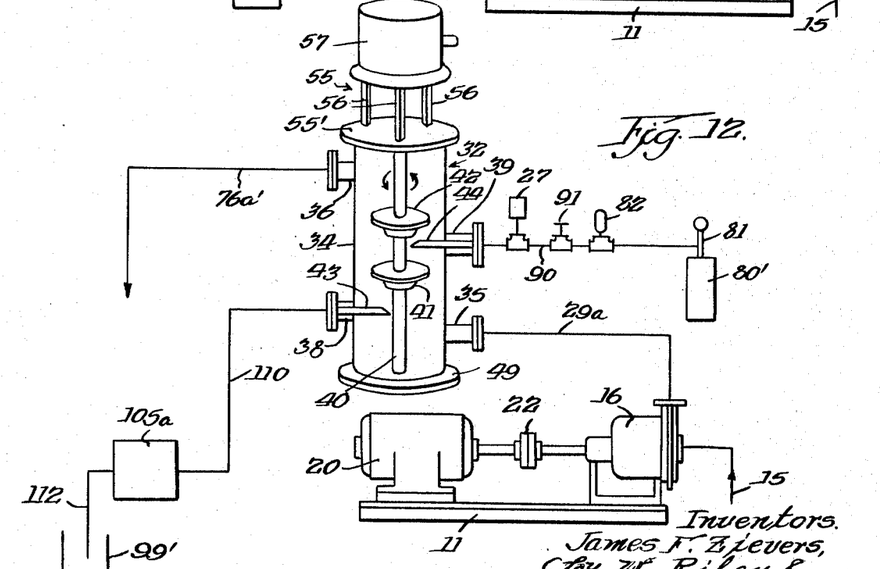
FIGURE 12 is a schematic diagram for either a single stage cyanide destruction system or a chromium reduction system illustrating the flow of the contaminated waste to be treated.

Referring to FIG. 3 in either the single stage system or two stage system Teflon lined hoses connect the chlorine cylinder 80 to the connections of mixing chamber assembly 32 if a single stage system or to the mixing chamber assemblies 32 and 32' of the two stage system of FIG. 11. Referring to FIG. 5 and FIG. 11, needle valves 91 adjust the flow of chlorine gas to each stage through the Teflon lined hoses 90 and 90'. Referring to FIGURE 3 and FIGURE 11, automatic valves 27 control the flow of chlorine to the respective mixing chamber assemblies 32 and 32' of the two stage cyanide destruction system. Referring to FIG. 12, the automatic valve 27 controls the flow of chlorine to either the single stage cyanide destruction system or the flow of sulphur dioxide to the chrome reduction system, similarly illustrated.

In either the single stage or two stage systems, the respective automatic valve 27 is operatively connected to the discharge connection 23 as illustrated in FIGURE 4 through plastic tubing 93, FIGURE 3. The connection of the plastic piping 93 is suitably connected for example in a single stage as illustrated in the solid lines of FIG. 4 or to a two stage system as shown by the solid line 93 and the dotted piping 93'. In the single stage connection of FIGURE 4, an elbow 94 is connected to the piping 93. However, in a two stage system one would use a T-connection in place of the elbow 94. The plug cock 26 controls the flow rate from the pump discharge connection 23 and provides back pressure to actuate the automatic valve 27 in either the single stage or two stage cyanide destruction system and would also serve to actuate a similar automatic valve on the sulphur dioxide feed of a chrome reduction system which is a single stage system. A pressure switch 95, FIG. 4, may also be electrically operatively connected to the solenoid automatic valves 27 and 27' in either the single stage or two stage system to stop the chlorine or sulphur dioxide feed when the sump pump 16 is off.

Referring to FIG. 5 and FIG. 11, although separate needle valves 91 may be used for connecting the chlorine tank to each of the mixing chamber assemblies 32 and 32', it is also within the scope of the invention that a single needle valve 91 may be used for controlling the two chlorine lines without departing from the scope of the invention.

Referring to FIG. 6, there is illustrated the piping for discharging chlorine feed to each of the mixing chamber assemblies of a two stage cyanide destruction system wherein pipe nipples 96 and 96' are connected to the mixing chamber assemblies 32 and 32' and plug cocks 27' controls the flow rate and provides back pressure to actuate the automatic valve 27 on the chlorine feed line 90, in this instance being a single Teflon lined hose operatively connected to the chlorine tank 80. A pipe nipple 97 is connected to pipe connections such as an elbow and a T-connection for the piping connections 96 and 96' respectively, and in turn the feed connection is connected to a pipe connection 98 to which is attached plastic tubing similar to the plastic tubing 93 and 93' which in turn is operatively connected to the automatic valve 27 in the single line 90 which is connected to a suitable chlorine tank.

Referring to FIGURE 1, FIGURE 7, FIGURE 11 and FIGURE 12, there will be particularly described the alkali piping and tank and pumping system therefore for use in either the two stage cyanide destruction system of FIG. 11 or the single stage cyanide destruction system of FIG. 12. An alkali storage tank 99 preferably 18" in diameter and 36" deep may be affixed to skid 11 of the two stage apparatus 10 by angle brackets 100 and suitable securing means. Referring to FIGURE 7, the alkali tank 99 is provided with a suitable pipe connection 101 to which suitable chemical hose 102 may be connected to a strainer 103 operatively mounted at the bottom of the alkali tank 99. Exteriorly of the tank 99, a suitable chemical hose 104 is connected to the inlet end of a pump 105 driven by the motor 106 Referring to FIG. 1, the motor 106 and 106' respectively for the first and second stage of the cyanide destruction system are electrically connected to the control panel 87 by suitable wiring 107 and 107'. It is preferred that each motor shall be a variable speed motor for controlling the rate of flow of the alkaline solution within a predetermined range. Each motor is controlled by an on-and-off switch 108 and a suitable speed control knob 109. It is preferred to arrange the motors 106 and 106' and the respective pumps 105' as illustrated in FIG. 1, with each pump operatively connected to the respective outlet hoses 110 and 110'.

In the embodiment of FIG. 1 the alkali pump for each stage is preferably mounted in the space between the alkali tank 99 and the two mixing chamber assemblies 32 and 32'. It is within the scope of the invention that each motor driven pump may be similarly arranged as illustrated in FIGURE 1 but mounted upon and above the unhinged portion 111 of the alkali tank so that the hinged portion 111a may be raised from time to time for inspection of the alkaline solution within the tank and the filling of the tank. With the motor driven pumps mounted in this manner, the controls and switches for each motor are more readily available for controlling the flow of the alkaline solution to each of the stages of the cyanide destruction system whether single or two stage.

Referring to FIG. 11, the alkaline solution feeding system for the two stage cyanide destruction system has the pumps 105a for the alkaline solution illustrated as being connected to a motor 106a provided with a double ended shaft so that single motor 106a rather than two motors may be used in the operation of the system if so desired. The pumps 105a' have their inlet ends connected by similar hoses 112 within the alkali tank 99. Each of the alkali feed tubes 43 of the two stage destruction system is connected by similar plastic chemical hoses 110 and 110'. In FIGURE 12, the alkali feed tube 43 of the single stage cyanide destruction system or of the single stage chrome reduction system is connected to a motor driven pump 105a by similar chemical plastic tubing 110.

Referring to FIG. 12, the single stage cyanide destruction system will be briefly described. Since the single stage cyanide reduction system is substantially identical to the first stage of the two stage cyanide destruction system like reference characters will indicate the same or similar parts. In the operation of the single stage system the cyanide waste is pumped from the waste sump by the pump 16 and is discharged into the mixing chamber assembly 32 through the piping 29a and through the lower flanged conduit 35 into the mixing chamber 34. The waste cyanide solution is mixed with an alkaline solution pumped from the alkali storage tank 99' by the pump 105a through the chemical hose 112 and into the outlet hose 110 where it is discharged into the mixing chamber 34 through the flanged conduit 38 by the feed pipe 43. At this point, the waste solution and the alkaline solution are mixed by the impeller 41 and discharged upwardly where it is mixed by the impeller 42 with chlorine discharged from the chlorine tank 80' through the feed pipe 44. After the solution of the waste cyanide and alkaline solution are treated with the chlorine gas, the treated solution is thoroughly mixed by the impeller 42 and discharged through the flanged conduit 36.

Again referring to FIGURE 12, the single stage apparatus will be briefly described when used for a chrome reduction system. In a chrome reduction system, the alkali storage tank 99' is replaced by a sulphuric acid carboy with the pump 105a connected to a tube extending substantially to the bottom of the carboy. Instead of the chlorine tank, a similar tank for sulphur dioxide is substituted. The flow diagram for a chrome reduction system using the single stage apparatus of FIGURE 12 is substantially identical to that of the single stage cyanide destruction system. In the chrome reduction system, the waste chrome solution is pumped through the pump 16 and piping 29a into the mixing chamber and at the same time the sulphuric acid is pumped from the carboy by the pump 105a and discharged through the feed pipe 43. The waste chrome solution and the sulphuric acid are thoroughly mixed by the impeller 41 and discharged upwardly to the point where the sulphur dioxide is similarly fed by the feed pipe 44 where it is thoroughly mixed the solution of chrome waste and sulphuric acid by the impeller 42 and discharged as treated waste through the upward conduit 36 through the hose 76a'.

The arrangement, as described with reference to the two stage apparatus of FIGURE 1, could be used for either the single stage cyanide destruction system or the single stage chrome reduction system, by substituting for the alkali storage tank in the cyanide system an acid carboy. It is preferred, however, to arrange the motor 20 and pump 16 and primer strainer tank 12 as in FIGURE 1 and with the single stage mixing chamber at right angles thereto, having the single stage mixing chamber assembly connected to a sight glass similarly arranged as sight glass 73' of FIGURE 2 rather than the vertically positioned sight glass 73 of FIG. 2. The control panel 87 for the single stage chrome system is then arranged preferably parallel to the axis of the motor 20, pump 16 and primer tank 12 and also substantially in alignment with the first stage mixing chamber assembly. The acid corboy is placed on the skid platform to be detachably connected to a similar motor driven pump 105 which is arranged substantially to the right of the motor 20 and between the carboy.

Referring to FIGURE 1, the chlorine tank 80 is held upright by a channel shaped frame member 115 extending vertically the same height as the U-shaped channel frame 116 into which the control panel 87 is mounted by suitable brackets. The control panel being bolted to the U-shaped channel frame 116 which is preferably formed of angle iron and bent to shape and affixed to the top of the skid frame 11. The channel shaped frame member 115 is suitably welded at the edge of the base of the notched opening 117 in which the tank 80 is mounted. The frame member 115 is also preferably welded to one of the upright edges of the U-shaped channel frame 116. A flexible tank supporting strap member 118 is affiixed to one leg of the channel member and the other end is detachably affixed to the other leg of the channel-shaped frame member.

The control panel for the single stage chrome reduction system is similar to that as described with reference to the U-shaped channel frame 116 for the control panel 87 of the two stage system. However, as the control panel is mounted somewhat to the left as described with reference to the mounting of the control panel in the two stage system, the U-shaped frame member supporting control panel is mounted substantially contiguous to the frame 21 of the pump motor 20. However, in either arrangement, a sump pump switch 119, FIGURE 8 operative in on-automatic-off position as well as the alarm bell switch 120 in on-off position, are located so they may be readily controlled by an operator in either arrangement of the control panel 87.

The control panel 87 FIGURE 8, is preferably an NEMA 12 enclosure having the on-off switches for the mixing motors and pump motors located inside. Suitable wiring 121 and 122 operatively connects the motors 57 and 57' to the respective motor controls within the control panel 87.

The control panel may be operatively connected to a suitable source of power which is preferably 115 volts for the starter circuits for the mixer motors and the main sump motors which preferably operate from 220 volts as previously described. The typical control panel includes a five gang box cover together with a conventional terminal block. There is positioned in the control panel an overload heater for the chemical feed pump as well as overload heaters for the mixer motors and also an overload heater for the sump pump motor. There is also included two manual starting switches for the metering pump and low gas pressure alarm. The switch 119 for the sump pump is a three position selector switch while the alarm bell switch 120 is a two position selector switch. The control panel also includes three magnetic starter switches for the two mixer motors and the main sump pump motor and a control relay for the circuits of the mixer motor starter and sump pump motor starter and for the metering pump, low gas pressure alarm and automatic gas heat shut-off circuits. It is preferred to use flush tumbler switches for the mixer motor starter circuit, the sump pump motor starter circuit and the metering pump circuit. Pressure switches are used in the sump level controller, the low gas pressure alarm circuit and the automatic gas feed shut-off circuit. The panel control box includes a 0.5 kva. transformer for the control circuits. The panel box also includes a suitable fuse block and fuse for the 115 volt circuit. If desirable the panel box 87 may have operatively connected thereto an air trap to minimize the corrosion within the control box because of the corrosive fluids and gases with which the apparatus is used.

Although there has been described above a preferred form of electric circuitry for the apparatus including the motors and safety circuits thereof and control circuits, it is within the scope of the invention that other circuits and control boxes may be used without departing from the scope of the invention.

Referring to FIGURE 1, FIGURE 2, and FIGURE 11, the operation of the two stage cyanide destruction system will be described. The waste solution is preferably fed to the primer strainer tank 12 from the sump which contains the waste cyanide solution. In the treatment, the waste cyanide solution is pumped into the bottom of the first stage rubber lined mixing chamber 32. The motor driven impellers 41 and 42 are driven at the preferred speed by the motor 57. An alkaline solution is fed directly into the vortex of the lower impeller 41. The effluent from the first stage is adjusted until the pH level is 10 to 11. The pH level is checked by a universal indicator paper in a suitable sample taken from the sampling cock 71 of the outlet at the top of the mixing chamber assembly.

An automatic valve 27, FIGURE 11 at the second impeller of the first stage admits gaseous chlorine into the vortex of the upper impeller 42. The needle valve 91 at the chlorine tank 80 is adjusted by hand until there is a chlorine residual at the sampling cock 71 which may be tested with starch iodide paper. The automatic valve 27 opens when the pump 16 starts. In this first stage, the cyanide bearing wastes have been oxidized to the cyanate form, i.e. CN to CNO.

The second stage is similar to the first stage with respect to the cyanide destruction system, but, the pH level is adjusted to between 7 and 8. The hand adjustment of the chlorine tank to the second stage is adjusted until there is a chlorine residual at the sampling cock 71' FIGURE 2. The chlorine residual is tested with starch iodide paper.

In the two stage cyanide destruction system, there is complete oxidation of cyanide bearing rinses to carbonaceous and nitrogenous end products. Alkali is necessary in each stage to prevent the evolution of toxic gases such as notrogen trichloride or cyanogen chloride. The hydraulic loading of the two stage system is up to 1200 g.p.h. of cyanide rinse water. The contaminate loading is up to 4 lbs of CN/hr. As described above, the electrical requirement is preferably 220 volt, three phase, 60 cycle. In the two stage apparatus of this invention, the space requirements are substantially a minimum to approximately 4 ft. by 4 ft. by 5 ft. high. The chemical requirements for such a two stage system is substantially 8–10 pounds $Cl_2$ per pound of cyanide in 150 lb. or one ton cylinders together with 5–6 lbs. of alkali per lb. of cyanide treated in the rinse water.

Referring to the single stage cyanide destruction system of FIGURE 12, the oxidation of cyanide bearing rinses to the cyanate stage is continuously performed. The operation of the single stage cyanide destruction system is similar to the first stage of the two stage cyanide destruction system as described above. In the single stage system as well as the two stage system, the hydraulic loading is up to 1200 g.p.h. of cyanide rinse water. Similarly, the contaminate loading is up to 4 lbs. CN/hr. The same requirement is used and the space requirement of 4 ft. x 4 ft. x 5 ft. high is substantially the same as in the single stage as well as the two stage. However, in a single stage cyanide reduction system, the chemical requirement is substantially 4–5 lbs. $Cl_2$ lb. of CN in 150 lb. cylinders with the addition of 4 to 5 lbs. of alkali per lb. of cyanide.

In either the two stage or single stage cyanide destruction systems of this invention, it is preferred that the cyanide rinses should be segregated from all others and sent to a central collection sump or sumps in order that it may be picked up by either the single stage or two stage primer strainer tank. Also, any concentrated dumps must be held and bled into a dilute stream over a reasonable period of time.

With the single stage cyanide destruction system, the destruction of cyanide rinse waters is by means of partial oxidation to the cyanate state which is acceptable in some city, county and state jurisdictions, but where these jurisdictional areas require complete destruction to carbonaceous and nitrogenous end products, then the two stage cyanide destruction system is necessary.

Referring to FIGURE 12, the chromium reduction system which utilizes the same apparatus as the single stage cyanide system with the exception that instead of chlorine gas sulphur dioxide is used and instead of the alkaline solution, sulphuric acid is used. In this system, the acid which is generally sulphuric acid is fed to lower the pH level between 2 to 3. The pH level may be tested by sampling from the sampling cock of this single stage apparatus. The sight glass of the single stage apparatus permits visual observation when the chrome waste solution changes from yellow to green indicating a change in the chromium from the hexavalent to the trivalent state. The sulphur dioxide is added at the upper impeller from the sulphur dioxide cylinder. Other reducing agents such as hydrogen sulphide may also be used. This single stage chrome reduction system permits reduction of hexavalent to trivalent chrome on a continuous basis. The hydraulic loading of the system permits operation up to 1200 g.p.h. of chrome bearing wastes having a contaminant loading of up to five pounds $Cr+6$ per hour. The electrical requirement is the same as that required for the single and two stage cyanide destruction systems. Likewise, the space requirement is the same as the single and two stage cyanide reduction system.

The chemical requirement is substantially 3–4 lbs. $SO_2$/lb. of $Cr+6$ in 150 lb. cylinders and additions from substantially 2–4 lbs. $H_2SO_4$ per lb. of $Cr+6$. The resulting effluent from the mixing chamber of the chromium reduction system may in most cases be sent to the sanitary or storm sewer with dilution by continuously flowing acid and alkaline rinses. In certain instances, some regulatory agencies may require subsequent alkaline neutralization which is a simple pH increase from pH 3–4 to pH 5–9 when discharged to the final neutralization basin. With alkaline neutralization $Cr(OH)_3$ precipitates and may have to be removed by filtration or other means.

While there has been described what are at present considered to be the preferred embodiments of the invention, it will be understood that various modifications may be made therein which are within the true spirit and scope of the invention as defined in the appened claims.

We claim:

1. A single stage waste treatment system comprising a substantially square skid, a motor driven waste pump operatively mounted on said skid contiguous to an edge thereof, a primer tank operatively connected to said waste pump and adapted to be connected to a sump for contaminated waste, a mixing chamber operatively connected to said waste pump, said mixing chamber comprising a vertical chamber, vertically spaced impeller means operatively mounted within the mixing chamber, motor means operatively connected to a shaft operatively mounting the impellers for rotating the impeller means, a storage tank for a solution for treating the contaminated waste, feed pump means operatively connecting the storage tank for a solution for treating the contaminated waste and to the mixing chamber for feeding the treating solution at the vortex of the impeller contiguous to the entrance of the contaminated waste to the mixing chamber, a gas cylinder adapted for detachable mounting to the skid including piping connecting the gas cylinder to the mixing chamber for feeding gas to the mixture of solutions at the vortex of the second impeller, piping operatively connected to the upper end of said mixing chamber for discharging the treated waste including a sample cock for sampling the effluent of treated waste, and a sight glass for observing the treated waste as it is discharged from the single stage waste treatment system.

2. A two stage waste treatment system comprising a substantially square shaped skid, a motor driven sump pump operatively mounted on said skid continguous to one edge thereof, a primer tank operatively mounted on one corner of said skid and substantially in alignment with said motor driven sump pump, said primer tank substantially in alignment with said sump pump and adapted to be operatively connected to a contaminated rinse sump, a plurality of mixing means operatively connected together and to said sump pump, each of said mixing means comprising vertically spaced impellers and motor means for operatively driving the vertically spaced impellers, said mixing means positioned continguous to an edge of said skid and substantially at right angle to said motor driven sump pump and primer strainer tank, a storage tank for a treating solution contiguously mounted to said motor driven sump pump and operatively mounted on said skid contiguous to the edge opposite to the edge along which the mixing means are mounted, feed pumps operatively mounted contiguous to the solution storage tank and intermediate the storage tank and the mixing means, each of said feed pumps operatively connected to the respective mixing means for feeding solution from the storage tank contiguous to the lowermost impeller of each of the mixing means, said skid being notched at a corner opposite the primer strainer tank and adapted for supporting a gas cylinder, said gas cylinder being adapted to be operatively connected to each of the mixing means for feeding gas under pressure to the uppermost impeller of each of said mixing means, a control panel operatively mounted on said skid contiguous to the edge opposite that alongside of which said motor driven sump pump is operatively positioned, said control panel being intermediate the gas cylinder when affixed in operative position with respect to the skid and the second mixing means, said control panel being electrically connected to the motor for the sump pump, a motor for the mixing means and a motor for the respective feed pumps operatively connected to the storage tank, testing cocks operatively connected to the outlet of each of the mixing means, and sight glasses operatively connected to each of the mixing means, one of said sight glasses operatively connected in piping connecting the outlet of one of said mixing means and the inlet of the other said mixing means, and the other sight glass operatively connected to the outlet of the second-mentioned mixing means.

3. A two stage waste treatment system as set forth in claim 2, comprising control valve means together with pressure regulating valve means operatively connected to the gas cylinder and to each of the mixing means, automatic valve means operatively connected along with the control valve means to each of the mixing means, whereby the pressure of the gas supplied to the mixing means and the amount thereof is regulated to control the pH level of the effluent treated waste from the two stage waste treatment system, pressure switch means operatively connected to an alarm bell of the control panel, said automatic valve operatively connected to the sump pump so that the automatic valve stops the feed of gas from the gas cylinder when the sump pump is off, and a sump pump switch of the control panel when the sump pump switch is in automatic position, the low sump level control is adapted to shut off the system and the high sump pump level is adapted to start the system, a plug cock operatively mounted in the piping between the sump pump and the first mixing chamber adapted to control the flow rate and provide back pressure for actuating the automatic valve means on the gas feed from the gas cylinder.

4. As an article of manufacture, a mixing chamber apparatus comprising a vertical mixing chamber, a supporting base for the vertical mixing chamber, said mixing chamber including a lower conduit means and an upper conduit means, vertically positioned flanged means operatively positioned on the mixing chamber intermediate the lower conduit and the upper conduit, said lower conduit providing an inlet passage for the waste fluid to be treated and the upper conduit means providing the discharge passage for the treated effluent, said lower flanged opening adapted for a connection for feeding a treating solution for the contaminated waste to be treated in the mixing chamber, and said upper flanged opening adapted for mounting feed means for supplying gas to the mixed contaminated waste and solutions for treating thereof, a plurality of vertically spaced impeller means operatively mounted upon a vertical shaft therefor, said vertically spaced impeler means including means for respectively vertically adjusting the impeller means so that the feed means for the lowermost impeller means discharges the solution within the vortex of the contaminated waste, and the second vertically spaced impeller means adapted to be adjusted for discharging the gas within the vortex of the contaminated waste and solution mixed therewith, said impeller means adapted for discharging the treated waste from the uper conduit means, lining means for the interior of the mixing chamber and the conduits and the connections for the feed means for the treating solution and the gas charged within the mixture being treated within the mixing chamber, gasket means for sealing the mixing chamber and the supporting base, securing means for affixing the mixing chamber to the supporting base, shaft guide means for operatively mounting the lower end of the impeller shaft and adapted to be mounted at the lower end of the mixing chamber, flanged means integrally formed with the vertical mixing chamber at the upper end therefor, a packing gland assembly operatively mounted on the flanged means at the upper end of the mixing chamber for journaling and sealing the upper end of the impeller shafts, a motor mounting means operatively mounted on the flanged means at the upper end of the mixing chamber, motor means operatively mounted upon the motor mounting, and means for operatively connecting the shaft of the motor with the impeller shaft of the mixing means whereby said motor means may be detachably connected from the mixing means.

5. Apparatus for chemically treating a liquid comprising:
an elongated mixing conduit having an inlet at one end and an outlet at the other end;
means for continuously passing said liquid through said conduit from said inlet to said outlet at a certain velocity;
an impeller mounted in said conduit with the axis of rotation of the impeller being disposed co-axially with the longitudinal axis of said conduit for continuously recirculating a portion of said liquid at a relatively greater velocity than said certain velocity of said flowing liquid in said conduit so that a vortex is formed as said liquid passes through said mixing conduit; and
a feed conduit for feeding a treating chemical to the vortex to mix said chemical with the vortically whirling liquid.

6. An apparatus according to claim 5, wherein said mixing conduit is disposed in a vertical position with said inlet at the bottom and said outlet at the top.

7. An apparatus according to claim 5, further comprising a second impeller mounted in said mixing conduit and spaced from the first-mentioned impeller with the axis of rotation of said second impeller being disposed co-axially with the longitudinal axis of said mixing conduit for continuously recirculating a portion of the mixture of said chemical and said liquid at a relatively greater velocity than said certain velocity of said flowing liquid in said mixing conduit so that a second vortex is formed as said liquid passes through said mixing conduit, and a second feed conduit for feeding another treating chemical to said second vortex to mix said other chemical with the vortically whirling chemical-liquid mixture.

8. An apparatus according to claim 5, further comprising a sight glass at said outlet.

9. An apparatus according to claim 5, wherein said liquid is a metal finshing waste, and said treating chemical is an alkaline solution.

10. An apparatus according to claim 9, further comprising means for continuously mixing an oxidizing agent to the liquid passing out of said mixing conduit.

11. An apparatus according to claim 10, wherein said liquid is a chromium bearing waste and said treating chemical is sulphuric acid.

12. An apparatus according to claim 10, wherein said liquid is a cyanide bearing rinse and said oxidizing agent is chlorine gas.

13. An apparatus according to claim 12, further comprising means for adjusting the supply of said alkaline solution to said mixing conduit to maintain the pH level between 10 and 11.

References Cited

UNITED STATES PATENTS

| | | | |
|---|---|---|---|
| 2,763,666 | 9/1956 | Mastagli | 23—285 X |
| 2,768,987 | 10/1956 | Hart | 23—285 X |
| 3,022,894 | 2/1962 | Karlen | 210—455 X |
| 3,266,872 | 8/1966 | Terao et al. | 23—270.5 X |

FOREIGN PATENTS 895,740    5/1962    Great Britian.

OTHER REFERENCES

Dobson, J. G.: The treatment of cyanide wastes by chlorination, Sewage Works Journal, vol. 19, November 1947, pp. 1007 and 1011–1020 relied on. (Copy in Group 171.)

Pinkerton, H. L.: Waste disposal, Chapt. 11 of Electroplating Engineering Handbook, pp. 285, 291 and 294–306 relied on. (Copy in group 171.)

MICHAEL E. ROGERS, *Primary Examiner.*

UNITED STATES PATENT OFFICE
CERTIFICATE OF CORRECTION

Patent No. 3,391,789                 July 9, 1968

James F. Zievers et al.

It is certified that error appears in the above identified patent and that said Letters Patent are hereby corrected as shown below:

Column 5, line 27, after "impeller" insert -- shaft 40 on which are affixed vertically spaced impellers --. Column 6, line 49, "nilet" should read -- inlet --; line 50, "upepr" should read -- upper --.

Signed and sealed this 30th day of December 1969.

(SEAL)
Attest:

Edward M. Fletcher, Jr.            WILLIAM E. SCHUYLER, JR.
Attesting Officer                    Commissioner of Patents